June 17, 1969  D. J. SCHMITT  3,451,028
SNAP DISC THERMOSTAT

Filed Oct. 27, 1967  Sheet 1 of 3

INVENTOR
DONALD J. SCHMITT
BY
MCNENNY, FARRINGTON, PEARNE & GORDON

ATTORNEYS

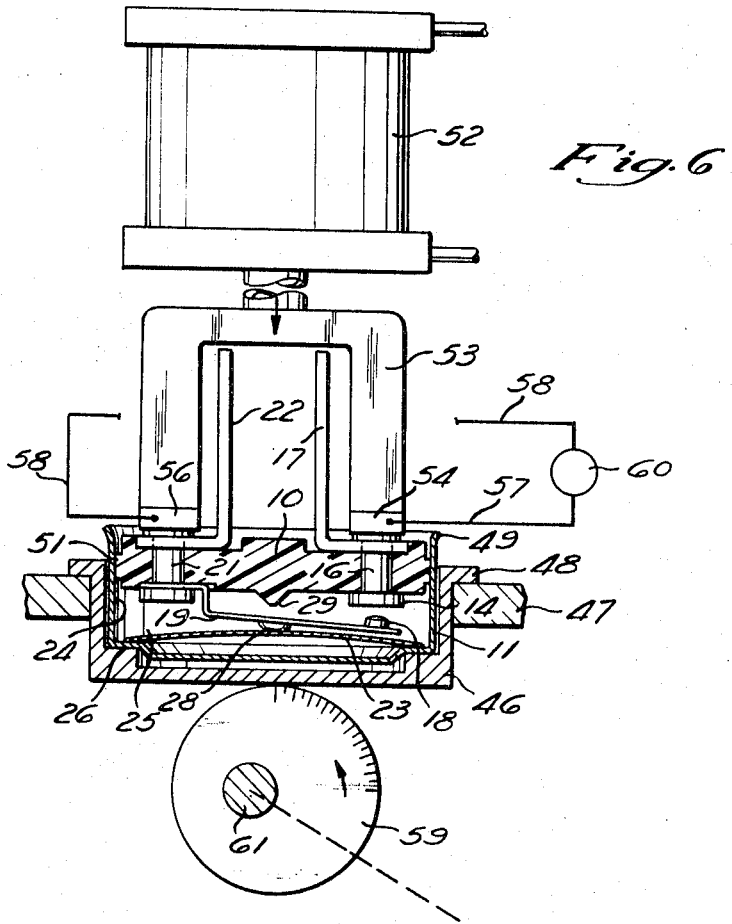
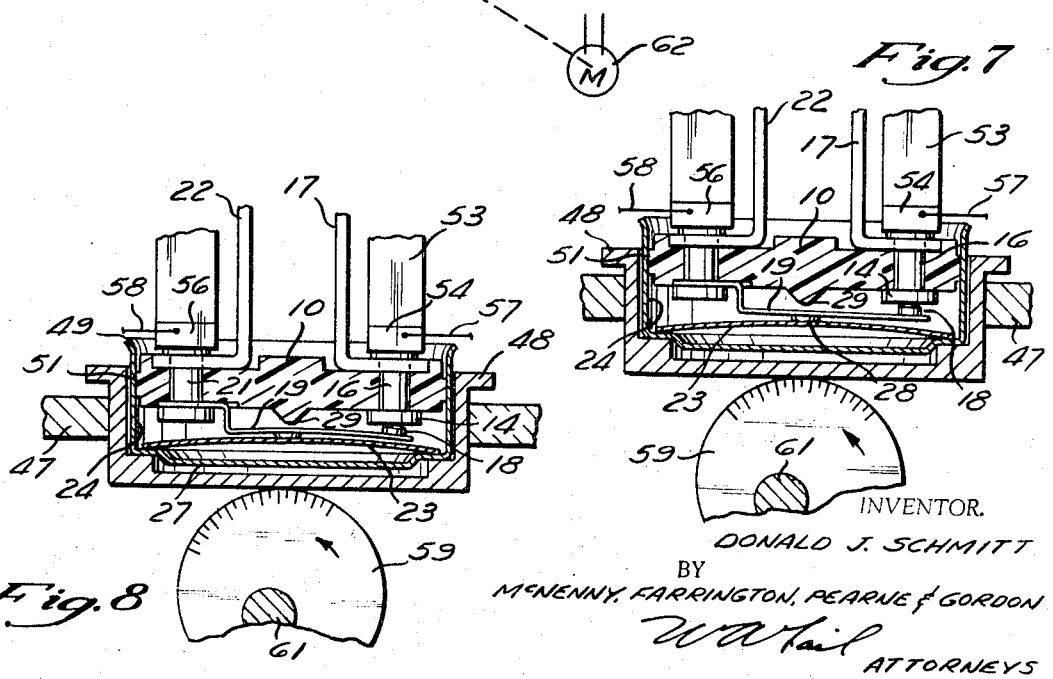
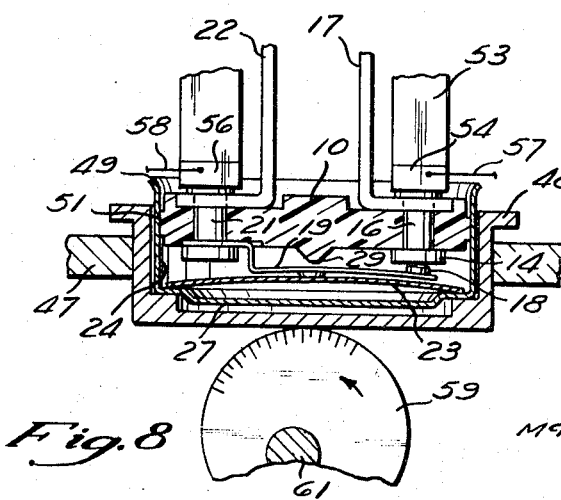

United States Patent Office 3,451,028
Patented June 17, 1969

3,451,028
SNAP DISC THERMOSTAT
Donald J. Schmitt, Mansfield, Ohio, assignor to Therm-O-Disc, Incorporated, a corporation of Ohio
Filed Oct. 27, 1967, Ser. No. 678,586
Int. Cl. H01h 37/74
U.S. Cl. 337—343                                    6 Claims

ABSTRACT OF THE DISCLOSURE

A snap disc operated thermostat in which the switch body and disc case are free of surfaces which would limit the final assembled position. Variations in the sizes of the component parts are compensated for by partially assembling the device until the switch first closes. This provides a reference point which compensates for component part size variations. The body and case are then moved to a final position of assembly through a predetermined distance arranged to insure proper snap operation of the switch in both opening and closing. Such predetermined distance is selected to compensate for existing ambient temperature during assembly and for the amount of creep between one position of stability and the adjacent position of instability.

Background of invention

This invention relates generally to condition responsive switching devices and more particularly to a novel and improved snap disc operated switching device such as a thermostat or the like and to a method for manufacturing such devices.

Various types of thermostats, or the like, employ a snap disc to actuate a switch. Such a snap disc operates to insure that the switch opens and closes with snap action rather than with a slow creep-type movement. In some devices of this type the disc is formed of bimetal and snaps between two positions of stability in direct response to predetermined changes in temperature. In other such devices the device snaps in response to other conditions such as pressure. Pressure actuated snap disc devices may be used as thermostats if the pressure being sensed is a function of temperature or such devices may be used to determine a pressure condition within a system.

The present invention is particularly applicable to bimetallic snap disc operated thermostats and such an embodiment of this invention is illustrated. However, in its broader aspects, this invention is also applicable to devices which do not sense temperature directly or indirectly.

Prior art

Snap disc, particularly in the smaller disc sizes, provide a relatively small snap travel. Consequently relatively high precision is required to manufacture such devices to insure that the manufacturing tolerances of the various components do not result in a device which fails to operate properly.

For example, many disc operated devices include a bumper extending between the switch and snap disc. In the manufacture of such devices it is common to partially assemble the device and then gauge the subassemblies to determine the exact length of the bumper required for the particular assembly. A bumper is then hand fitted to the required length and the assembly is completed. Such a manufacturing procedure is expensive since it requires highly skilled assembly personnel and in some instances results in defective assemblies.

Summary of invention

A thermostat or the like incorporating the present invention is arranged to eliminate the need for selective fitting of its elements and is adapted for assembly by a novel and improved method which automatically compensates for variations in the manufacturing tolerances of the particular elements of the assembly.

The illustrated thermostat is provided with a cup-shaped case and a switch body which tightly fits into the case with sufficient friction to temporarily retain the body and case in an assembled position. The body and case are free of surfaces which would limit the exact position of the body with respect to the case.

During assembly the body with the switch elements mounted thereon is moved into the case until it is positioned for proper operation with the particular components of the assembled device. Therefore, variations in the size of each element resulting from manufacturing tolerances are automatically compensated for, and it is not necessary to selectively fit the various elements of the device. After the body is properly positioned in the case, cement is used to permanently lock the case in this position. In the illustrated embodiment this cement is also used to secure the thermostat to a mounting base and to hermetically seal the thermostat.

The preferred method of assembling is as follows. The switch is mounted on the switch body and the snap disc is placed in the case with the convex side up. The body is then pressed into the case until the switch closes. This provides a reference position which compensates for variations in the size of the component parts, caused by manufacturing tolerances. The body is then pressed further into the case a predetermined distance to its final assembled position. This additional predetermined distance is selected so that the switch will operate with snap action in both opening and closing.

Preferably the additional predetermined distance is adjusted to compensate for the environmental temperature at the time of the assembly. When this is done, it is not necessary to assemble the thermostat in a controlled temperature environment and changes in the temperature of the room in which the assembly takes place do not adversely affect the accuracy of the assembly.

This invention, therefore, makes it possible: to minimize the amount of highly skilled labor required during the assembly of the thermostat, to eliminate the need for selective fitting of the parts, and to provide automatic compensation for variations resulting from manufacturing tolerances.

Objects of invention

It is an important object of this invention to provide a novel and improved snap disc operated condition responsive switching device such as a thermostat or the like.

It is another object of this invention to provide a novel and improved method of assembling snap disc operated switching devices such as thermostats, or the like, which automatically compensates for variations resulting from manufacturing tolerances and eliminates selective fitting during assembly.

Further objects and advantages will appear from the following description and drawings wherein:

FIGURE 6 is a schematic illustration of one apparatus for assembling the thermostat of FIGURES 1 and 2 in accordance with the novel and improved method of this invention, illustrating the thermostat elements in a first intermediate position of assembly;

FIGURE 7 is a fragmentary schematic view, similar to FIGURE 6, illustrating the position of the thermostat elements in a second intermediate position of assembly when the switch first closes; and FIGURE 8 is a fragmentary view, similar to FIGURES 6 and 7, illustrating the thermostat elements in the final assembled position.

Figure 2:
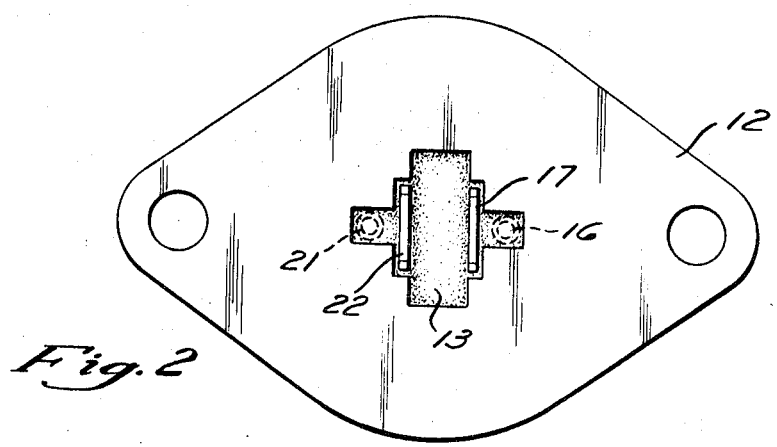
FIGURE 2 is a plan view of the thermostat illustrated in FIGURE 1.
Figure 1:
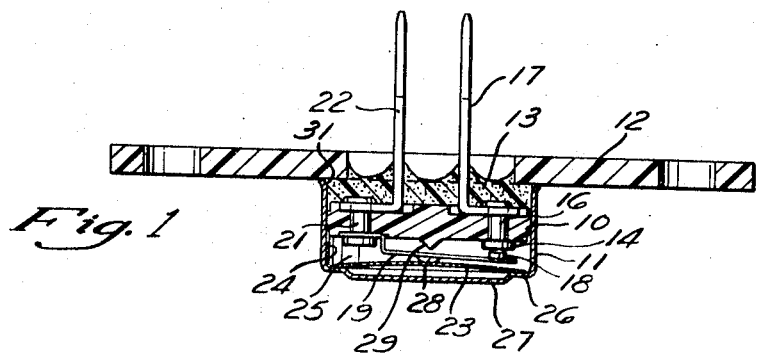
FIGURE 1 is a cross section of a finished thermostat incorporating this invention.

Referring to FIGURES 1 and 2, the illustrated embodiment of a thermostat incorporating this invention includes a switch body 10 positioned within a cup-shaped case 11 and a mounting base 12 secured to the body 10 and the case 11 by a cement 13. Mounted on the switch body is a fixed contact 14, which in the illustrated embodiment is part of a rivet-type fastener 16. The fastener 16 connects to a first conductor element 17 which is adapted to be connected to an external circuit.

A mobile contact 18 is mounted on one end of a spring arm 19 which is secured at its other end to the body 10 by a rivet 21. The rivet 21 also mounts a second conducting element 22, which is adapted to be connected to an external circuit. When the mobile contact 18 is in engagement with a fixed contact 14 as illustrated in FIGURE 1, electrical continuity is provided between the two elements 17 and 22 and a switch closed condition exists. When the mobile contact 18 moves away from the contact 14, the circuit is opened.

The case 11 and switch body 10 cooperate to define a switch cavity 25 in which the contacts and the mobile contact spring arm 19 are mounted. Also positioned within the switch cavity 25 is a bimetallic snap disc 23 which is radially located by a cylindrical inner wall 24 provided by the case 11. The case 11 is formed with an end wall including a peripheral shoulder 26 extending inwardly from the cylindrical wall 24 to a centrally located recess 27. The periphery of the snap disc 23 on the side remote from the mobile contact support arm 19 engages the shoulder 26 to axially locate the snap disc in the device and the recess 27 provides clearance for the central portion of the disc. The spring arm 19 is formed with a projection 28 which engages the central portion of the disc 23 on the side opposite the shoulder 26.

The various elements are proportioned so that the mobile contact 18 engages the fixed contact 14 when the snap disc is arched toward the switch body 10 as illustrated in FIGURE 1 and so that the two contacts are spaced apart and the switch is open when the snap disc is arched in the opposite direction. Under this condition the central portion of the snap disc extends down into the recess 27 but contact is maintained between the projection 28 and the snap disc so that the snap disc is correctly positioned in the case 11.

The various parts are assembled so that the switch opens and closes with a snap action and so that a bumper 29 is spaced from the support arm 19 when the snap element first snaps to the switch closed position. The bumper 29, however, serves to limit the deflection of the support arm 19 so that it is not stressed beyond its elastic limit in the event that the snap disc creeps to a position of a greater arch in the direction of the switch body 10.

The illustrated embodiment of this invention is provided with an imperforate case 11 and is arranged so that the switch body 10 is inward of the open end 31 of the case 11. Consequently the cement 13 adheres to the wall 24 adjacent to the open end and hermetically seals the entire device as well as permanently locating the body 10 with respect to the case 11. The two conductor elements 17 and 22 also extend up through the cement so that the cement assists in anchoring the elements 17 and 22 to prevent external forces applied thereto from being transmitted to the switch mechanism. In the illustrated thermostat the projection 28 directly engages the disc 23 so the case 11 may in some instances receive an electrical charge. However, if desired, a thin, flexible insulating disc of the type disclosed and claimed in the patent to Schmitt No. 3,014,105 may be positioned between the projection 28 and the disc 23 so that the case and disc are insulated from the switch elements.

Figure 3:
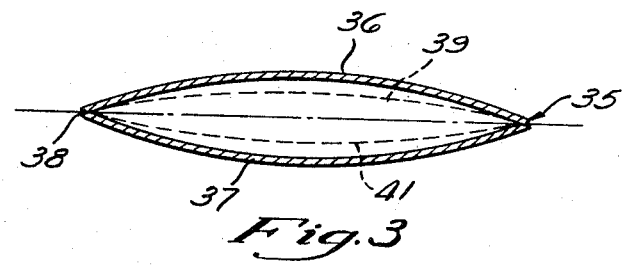
FIGURE 3 is a schematic cross section of a snap disc in its two positions of stability.
Figure 4:
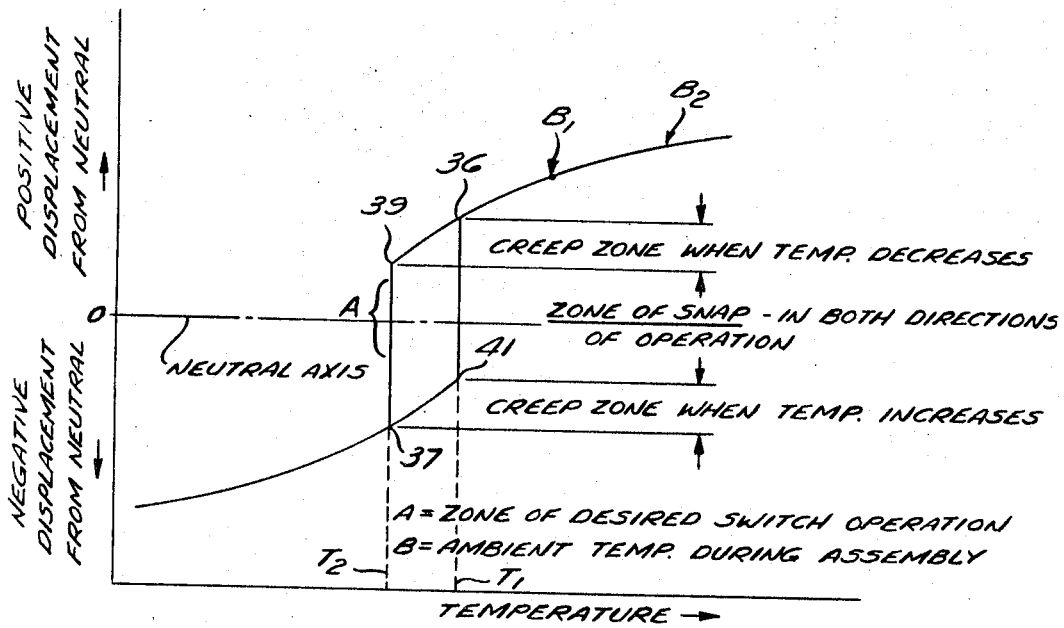
FIGURE 4 is a diagram illustrating the movement characteristics of a representative snap disc.
Figure 5:
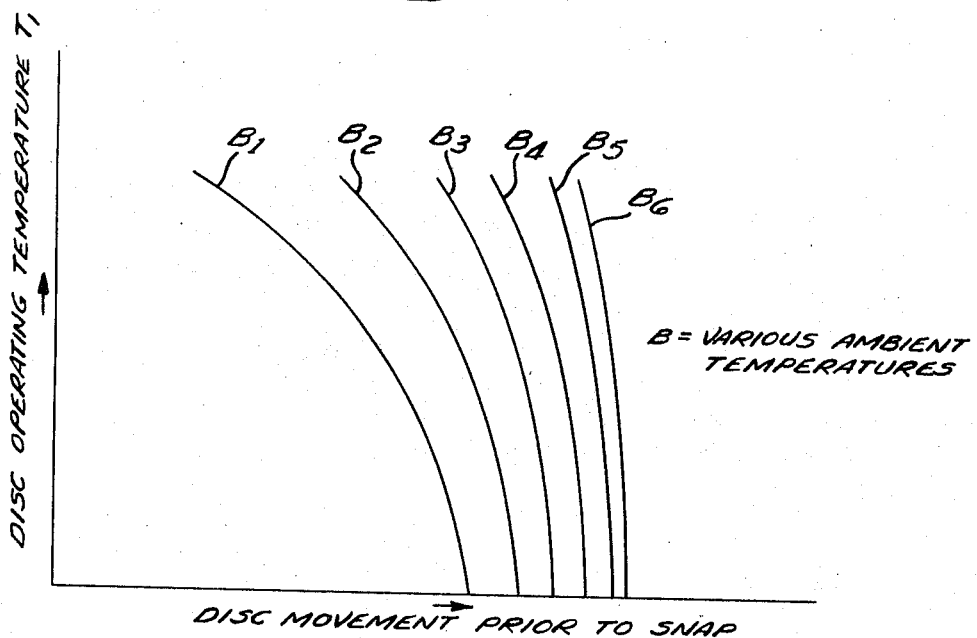
FIGURE 5 is an illustration of a chart used to determine the amount of creep which is present for a particular snap disc under a particular environmental temperature.

Referring now to FIGURES 3 through 5, a snap disc such as a bimetallic snap disc operates with snap action to rapidly move between two positions of stability. However, the snap disc does not move with snap action the entire distance between the two positions of stability. Rather it creeps or moves slowly through a creep zone until it reaches an unstable condition after which it snaps through to the opposite position of stability. This action occurs in both directions.

In FIGURE 3 a representative bimetallic snap disc is illustrated in its two positions of stability 36 and 37. In the first condition of stability 36 the snap disc 35 is arched upwardly from its periphery or rim 38. In the second position of stability 37 the central portion within the rim 38 is arched in a downward direction. It is assumed that the first position of stability 36 is the position reached on increasing temperature and the second position of stability 37 is the condition reached on a decrease in temperature. As the disc temperature decreases from its upper snap temperature, the snap disc 35 will move through a creep zone from the position 36 toward the position 37 until it reaches an unstable position represented by the dotted line 39. This movement will occur slowly as temperature changes and the unstable position represented by the dotted line 39 will be reached when the disc reaches its lower snap temperature. The movement beyond the position represented by the line 39 to the second position of stability 37 will thereafter occur almost instantaneously as a snap action.

Conversely when the temperature of the disc again increases from the lower snap temperature the disc will move through a creep zone from the second position 37 toward the first position 36 until it reaches an unstable position represented by the dotted line 41. This movement will again be a slow creep movement. When the disc reaches the unstable position 41, it is at a temperature equal to the upper snap temperature and further movement between the position of the dotted line 41 to the first position of stability 36 will again be substantially instantaneous or a snap movement.

The snap movement in one direction, therefore, occurs between the line 39 and the second position of stability 37 and in the other direction between the line 41 and the first position of stability 36. The only movement which occurs with snap action in both directions is the movement within the lines 39 and 41. Therefore, it is necessary to arrange a thermostat or the like so that the switch opens and closes within the range of movement represented between the lines 39 and 41. On the other hand, if the switch operated to open and close in the range between the lines 36 and 39, the switch would snap closed but would creep open. This would cause undesirable arcing and rapid contact deterioration. A similar undesirable condition can occur if the switch operates in the range between the lines 41 and 37.

The creep movement and snap movement of a disc is represented in graph form in FIGURE 4. In this graph the vertical scale is split at the neutral axis 0 as positive displacement from the neutral axis in an upward direction and negative displacement from the neutral axis in a downward direction. Temperature is plotted in a horizontal direction. The two positions of stability 36 and 37 are illustrated with one above and one below the neutral axis.

When the disc moves from the position of stability 37 toward the position of stability 36 it moves through a first creep zone to a first position of instability 41 corresponding to the position of the dotted line 41 illustrated in FIGURE 3. It then moves with snap action to the first position of stability without further increase of temperature. Movement of the snap disc in the opposite direction occurs along the line between the first position of stability 36 and the position of instability 39 as the temperature decreases and then with snap action back to the second position of instability 37. The upper snap temperature $T_1$ is higher than the lower snap temperature $T_2$ by an amount determined by the manufacturer of the disc. Therefore, the disc can be in a stable condition in two different positions at temperatures between the temperatures $T_1$ and $T_2$.

If the temperature of the disc is elevated above the temperature $T_1$, for example to a temperature at $B_1$ or $B_2$, the disc will continue to creep beyond the upper position of stability at 36 toward a position of greater arch. Similarly if the temperature of the disc decreases below the temperature $T_2$, the disc will creep down along the lower curve to positions of greater negative arch.

If the thermostat is arranged so that the switch opens and closes anywhere within the zone of snap in both directions of operation, the switch will close and open with a snap action. In practice thermostats incorporating the present invention are assembled so that the switch opens and closes within a zone represented by the bracket A which is centrally spaced from both of the points of instability 39 and 41. This insures that snap action will occur in both directions in all of the thermostats assembled in accordance with the present invention.

In accordance with a prefered method of assembling a thermostat incorporating this invention, it is not necessary to control the ambient temperature at which the assembly takes place. When the ambient temperature is not controlled, however, it is necessary to determine the amount of creep between one position of stability such as the point 36 and the existing ambient temperature represented, for example by $B_1$ or $B_2$, and to modify the procedure of assembly to compensate for the existing ambient temperature during assembly. A chart or graph as illustrated in FIGURE 5 may be used for this purpose. In this chart the temperature $T_1$ of the snap disc is plotted on the vertical axis and the amount of creep is plotted on the horizontal axis. A family of curves $B_1$ through $B_6$ is plotted for a series of different but normally encountered ambient temperatures. For example, the curve $B_1$ might represent an ambient temperature of 65° F. and the curve $B_2$ might represent 70° F.

When it is desired to determine the amount of creep at a given ambient temperature for a given disc it merely is necessary to locate on the vertical scale the temperature $T_1$ for the particular disc being considered and then trace across in the horizontal direction until the existing ambient temperature curve is reached. The amount of creep is then determined by determining the position along the horizontal scale of such intersection. Of course interpolation can be used for intermediate ambient temperatures which do not fall specifically on one of the curves $B_1$ through $B_6$. It can be noted that the amount of creep beyond the temperature $T_1$ decreases for discs having a higher $T_1$ temperature and that the amount of creep increases as ambient temperature increases.

FIGURES 6 through 8 schematically illustrate a method incorporating this invention of assembling the thermostat illustrated in FIGURES 1 and 2 and illustrate schematically one apparatus for performing such method. Prior to the final assembly operation the switch elements are mounted on the switch body 10 and the disc 23 is positioned within the case 11. The case 11 is positioned within a cup-shaped fixture element 46 which in turn rests on a frame 47 of the assembly apparatus. The fixture element 46 is provided with a flange 48 which determines the lowermost position of the fixture element while permitting vertically upward movement from the position illustrated.

The open end of the case 11 is formed with a flared entrance portion 49 and the body 10 is formed with a peripheral surface 51 proportioned to fit into the case 11 with a tight or press fit. The body 10 with the switch elements mounted thereon is positioned at the open end of the case 11 and an actuator 52 is operated to move a U-shaped pressing device 53 down against the upper end of the rivets 16 and 21 as illustrated in FIGURE 6. The actuator 52 is then operated to push the body 10 down into the case for rough positioning as illustrated in FIGURE 6. The actuator 52 may be of any suitable type which is capable of exerting sufficient pressure to press the body 10 down into the case and which is also capable of locking in the position of FIGURE 6. In FIGURE 6 the actuator 52 is illustrated as a hydraulic actuator. The lower ends of the legs of the U-shaped element 53 are provided with electrical contacts 54 and 56 with one arranged to engage each of the rivets 16 and 21. Connected to these contacts are lead wires 57 and 58 which connect to any suitable indicating device 60. Thus when the switch of the thermostat first closes an indication is provided by the indicator device. The indicator device may be a bell for audio indication, a light for visual indication or any other suitable device.

In the first step of assembly the actuator moves the body 10 into the case for rough positioning as illustrated in FIGURE 6. At this time the mobile contact 18 is spaced from the fixed contact 14 and the switch is open.

A calibrated cam 59 is journaled for rotation with a shaft 61 which may be driven by a suitable motor 62. After the elements are positioned in the first intermediate position of FIGURE 6, the cam is rotated in an anticlockwise direction until a mobile contact 18 first engages the fixed contact 14. This is the position illustrated in FIGURE 7. This provides a reference position which automatically compensates for variations in the size of any of the elements of the assembly resulting from manufacturing tolerances or the like.

The position of the cam 59 is noted or recorded when the switch elements first close. The cam 59 is then rotated an additional amount to a final assembly position illustrated in FIGURE 8. This causes the fixture element 46 and in turn the case 11 and disc 23 to be raised a predetermined additional amount with respect to the switch body 10 and results in additional deflection of the mobile contact support element. The amount of additional movement between the position of FIGURE 7 and the final assembled position of FIGURE 8 is determined by reference to the chart illustrated in FIGURE 5.

The temperature $T_1$ of the particular disc being assembled in the thermostat is known and the ambient temperature existing in the room of assembly is known, so the chart of FIGURE 5 gives the amount of creep from the existing temperature B in the room to the first position in stability 36. The chart 5, therefore, gives the amount of creep for the given disc before the first position of stability 36 is reached. It may be, for example, twelve thousandths of an inch for a given disc at a given ambient temperature.

To this creep amount determined from the chart of FIGURE 5 is added a distance required to bring the device into the zone enclosed by the bracket A in FIGURE 4. This distance may be, for example, three thousandths of an inch. Therefore, in such an instance the cam 59 is rotated through an angle which causes the case 11 to be raised fifteen thousandths of an inch beyond the position of FIGURE 7 to the position of FIGURE 8. This insures that the disc and switch elements are properly positioned so that when the switch is operated by the snap disc it operates with snap action both for opening and closing and is within the range represented by the bracket A.

If, on the other hand, it is determined from the ambient temperature chart of FIGURE 5 that there are eight thousandths of an inch creep between the existing ambient temperature conditions and the first position of stability 36, the eight thousandths would be added to the three thousandths so the cam would be rotated through a sufficient angle to move the case and disc eleven thousandths of an inch with respect to the switch body 10.

After the thermostat is in the final assembled position of FIGURE 8, the actuator 52 is retracted and the assembly is removed from the fixture 46. Sufficient friction exists between the switch body 10 and the cylindrical wall 24 of the case 11 to retain the elements in the assembled position until the cement 13 and mounting bracket 12 are secured. After cementing, of course, the cement is relied upon to retain the elements in the properly assembled position.

The variations in the sizes of the elements are automatically compensated for by determining the position in which the switch elements first close. Therefore, selective fitting of the elements is not required. Also the variations in ambient temperature are adjusted for by using the chart of FIGURE 5 so that each assembled thermostat is precisely assembled for proper operation. It should be recognized that the exact position of the switch body 10 with respect to the case 11 will vary from thermostat to thermostat to compensate for variations in the sizes of the components of the thermostat. Therefore, the switch body 10 and the case 11 are arranged so that they are free of obstructions which would limit the precise position of assembly. In the illustrated embodiment the case is formed with a cylindrical wall 24 which tightly receives a cylindrical periphery on the body 10.

It should be noted that the bumper 29 is spaced from the mobile contact support arm in the final assembled position. However, the bumper is proportioned so that it is engaged by the support arm 19 before the support arm is stressed beyond its elastic limit in the event that the disc is caused to creep beyond its normal position as a result of being exposed to excessive temperatures. However, the bumper is spaced from the support arm when the disc is at temperatures approaching the operating temperatures so it does not affect the operation of the thermostat in opening and closing the switch. Further the support arm 19 is proportioned to maintain contact between the projection 28 and the disc in all positions of the disc so that the support arm 19 and the shoulder 26 cooperate to precisely determine the axial location of the disc at all times. Further the disc is preferably sized so that it fits the cylindrical surface 24 with a small amount of clearance so that the radial position of the disc is accurately determined.

With a method of assembling thermostats incorporating this invention the necessity of extremely close tolerance control of the manufacture of the parts is eliminated and the necessity of hand fitting or selectively fitting of the components is also eliminated. Therefore, the cost of manufacturing the thermostat is minimized without any sacrifice of accuracy of operation. Further, a novel and improved thermostat incorporating this invention provides accuracy of operation and reliability of operation in a very simple device.

Although a preferred embodiment of this invention is illustrated, it is to be understood that various modifications and rearrangements of parts may be resorted to without departing from the scope of the invention disclosed and claimed herein.

I claim:

1. A condition responsive switching device comprising a cup-shaped case providing an axially extending inner wall, a body in an assembled position in said case providing a peripheral surface tightly engaging said inner wall, said case and body being free of surfaces limiting the position of said body to said assembled position, bonding means securing said body in said assembled position, said body and case cooperating to define a chamber, a switch mounted on said body in said chamber providing a fixed contact and a cantilever mounted leaf spring mounted at one end on said body, the free end of said spring overlying said fixed contact and providing mobile contact ments movable into and out of engagement with said fixed contact to close and open said switch, a snap disc in said chamber on the side of said leaf spring remote from said body, said snap disc being movable between two positions of stability in response to two different predetermined environmental conditions, the central portion of said snap disc moving from each position of stability to the other position of stability first with a predetermined amount of creep movement followed by snap movement, said disc and spring arm being operably connected so that said switch is closed when said disc is in one position of stability and is open when said disc is in the other position of stability, said disc when in one position deflecting said spring beyond the initial closed position of said switch by an amount at least equal to said creep movement, the portion of said spring intermediate said one end and free end being unsupported on its side remote from said disc when said disc is in said one position.

2. A condition responsive switching device as set forth in claim 1 wherein said case is imperforate and cooperates with said bonding means to completely enclose said switch.

3. A condition responsive switching device as set forth in claim 2 wherein said switch is connected to external lead members, and said bonding means is a settable adhesive which provides support for said leads.

4. A condition responsive switching device as set forth in claim 1 wherein said body is formed with bumper means on the side of said spring remote from said disc which is proportioned to engage said spring and limit the stress applied thereto by said disc to stresses below the elastic limit of aid spring.

5. A condition responsive switch device as set forth in claim 1 wherein said disc is a bimetal disc movable between two positions of stability in response to two different predetermined temperatures.

6. A condition responsive switching device comprising a cup-shaped case providing an axially extending inner wall, a body in an assembled position in said case providing a peripheral surface tightly engaging said inner wall, said case and body being free of surfaces limiting the position of said body to said assembled position, bonding means securing said body in said assembled position, said body and case cooperating to define a chamber, a snap disc in said chamber, a switch mounted on said body in said chamber providing a fixed contact and a mobile contact assembly, said mobile contact assembly including a mobile contact movable into and out of engagement with said fixed contact to close and open said switch and spring means urging said mobile contact toward said disc, said snap disc being movable between two positions of stability in response to two different predetermined environmental conditions, the central portion of said snap disc moving from each position of stability to the other position of stability first with a predetermined amount of creep movement followed by snap movement, said disc and mobile contact assembly being operably connected so that said switch is opened and closed when said disc moves between said positions of stability, said disc when in one position of stability in which it is arched toward said body deflecting said spring means beyond the initial operating position of said switch by an amount at least equal to said creep movement, said body and mobile contact assembly being free of surfaces positively limiting movement of said disc conditions of arch toward said body greater than the arch in said one position of stability.

(References on following page)

References Cited

UNITED STATES PATENTS

| | | | |
|---|---|---|---|
| 2,889,430 | 6/1959 | Smith | 337—380 |
| 3,164,701 | 1/1965 | Kirchhubel | 337—348 |
| 3,230,607 | 1/1966 | Gelter | 337—112 |

BERNARD A. GILHEANY, *Primary Examiner.*

R. COHRS, *Assistant Examiner.*

U.S. Cl. X.R.

337—112, 380